Patented Jan. 7, 1936

2,027,314

UNITED STATES PATENT OFFICE 2,027,314

METHOD OF MANUFACTURING THIN-WALLED SHAPED BODIES

Eugen Heinlein, Berlin, Germany

No Drawing. Application October 7, 1933, Serial No. 692,617. In Germany October 13, 1932

1 Claim. (Cl. 25—155)

For manufacturing shaped bodies of concrete there are known methods in which the earth-moist mass is blown by compressed air from out of the receptacle containing that mass into moulds pressed directly against that receptacle. It has, however, been found that when making unusually large quantities of thin-walled shaped bodies, as, for instance, flower pots, drawbacks arise from the reason that the compression produced by the air-pressure in the mould is not strong enough to allow of immediately putting aside the blown bodies without providing any special means for supporting the shaped bodies. It is, in fact, necessary that the mass, i. e. the concrete or, may be, cement, first binds within the mould which requires a period of time of about 10 hours or even more before the blown article can be removed from the mould, in consequence whereof that known method which is intended especially for wholesale manufacture requires an enormous number of moulds.

Besides, the compression obtained solely by means of the compressed air is in certain cases not sufficient to bring about the requisite permeability to water of the shaped bodies or, as regards particularly thin-walled shaped bodies, the requisite tensile strength after the binding of the concrete or cement.

The before-mentioned drawbacks are overcome, according to the present invention, by subjecting the concrete or cement blown into the mould, prior to its getting bound, to the action of an either stationary or rotatory die, by which, after a mould part has been removed, the shaped body or article is subjected to an after-pressing procedure and a separate compression.

I am aware of the fact that it is no more new to produce concrete bodies by shaping them with the aid of a die and employing this latter for compressing the mass, but that procedure can be carried out only with pulpy masses, the excess of the individual portions of which protrudes forth from the mould and is then stripped off. Another known procedure is that in which a plastic mass like clay or the like is pressed by means of a die for manufacturing flower pots and other hollow bodies. In contradistinction to all that the gist of the present improved method consists in the combination of the blowing procedure, in which the earth-moist concrete is blown into a closed mould, with the compression of the concrete in the mould by a die, as is more fully described hereinafter.

In order to make matters completely clear I am describing here the manufacture of flower pots of concrete according to my improved method:

The pots are blown into a mould consisting of a shell and a core. Up to now it has been necessary to leave the shaped bodies in the mould (that is to say, either in the shell or on the core, in that one of these members is removed after the blowing) for a period of time of about 10 hours or more until the binding of the mass had proceeded far enough to allow of removing also the other part of the mould. In my improved method the moulds are filled and the mass is blown in the same manner as heretofore whereafter the core of the mould is removed, the shaped body being now held solely by the mould shell. In this state the mould shell with the shaped body in it is conveyed to a rotatory die which is a little larger than the removed mould core. The die is now introduced into the shaped body and pressed onto the same so strongly that the mass is correspondingly compressed and rendered dense to such a degree that the not yet bounded shaped body can be removed at once from the core too.

In cases in which the concrete or cement body is not of conical shape, the after-pressing and -compressing is effected with the aid of a stationary die.

It is suited to the purpose in view either to irrigate with water or to dust with pure cement the mass that has been filled into the mould, but not yet been subjected to the after-pressing, whereby another increase of the density and the strength of the finished article is obtained.

I claim:

The method of manufacturing particularly thin-walled shaped bodies of earth-moist masses not able to flow, for instance concrete and cement, in moulds consisting of two parts, said method comprising blowing the mass into the mould, removing one of the mould parts, subjecting the mass in the remaining mould part to the action of a die so as to subject it to an after-pressing and -compressing, the strength of which is so chosen that also the other mould part can be removed prior to the mass having set.

EUGEN HEINLEIN.